(12) United States Patent
Dulay et al.

(10) Patent No.: US 7,954,509 B2
(45) Date of Patent: Jun. 7, 2011

(54) CHECK VALVES WITH HINGE SHAFTS RETAINED BY WELDING

(75) Inventors: Ralph L. Dulay, Chandler, AZ (US);
Maureen Sugai, Phoenix, AZ (US);
Amer Aizaz, Phoenix, AZ (US);
Michael Kolic, Phoenix, AZ (US);
David B. Tornquist, Chandler, AZ (US)

(73) Assignee: Honeywell International Inc., Morristown, NJ (US)

(*) Notice: Subject to any disclaimer, the term of this patent is extended or adjusted under 35 U.S.C. 154(b) by 972 days.

(21) Appl. No.: 11/831,446

(22) Filed: Jul. 31, 2007

(65) Prior Publication Data
US 2009/0032119 A1    Feb. 5, 2009

(51) Int. Cl.
*F16K 15/03* (2006.01)

(52) U.S. Cl. .............. 137/512.1; 137/527; 137/15.18

(58) Field of Classification Search ............ 137/511, 137/512, 512.1, 527, 15.18
See application file for complete search history.

(56) References Cited

U.S. PATENT DOCUMENTS

| | | |
|---|---|---|
| 2,282,532 A | 5/1942 | Shenk |
| 2,877,792 A | 3/1959 | Tybus |
| 3,075,547 A | 1/1963 | Scaramucci |
| 3,452,778 A | 7/1969 | Babcock |
| 3,640,306 A | 2/1972 | Vogt |
| 3,678,958 A | 7/1972 | Satterwhite et al. |
| 3,965,926 A | 6/1976 | Buckner |
| 4,005,915 A * | 2/1977 | Canfield ................ 384/129 |
| 4,079,751 A | 3/1978 | Partridge et al. |
| 4,257,451 A | 3/1981 | Paton |
| 4,396,034 A * | 8/1983 | Cherniak ................ 137/514 |
| 4,586,534 A | 5/1986 | McNeely |
| 4,694,853 A | 9/1987 | Goodwin |
| 4,896,695 A | 1/1990 | Pysh |
| 4,977,926 A | 12/1990 | Hocking |
| 5,024,757 A | 6/1991 | Malak |
| 5,165,484 A | 11/1992 | Chaput |
| 5,246,032 A | 9/1993 | Muddiman |
| 5,529,404 A * | 6/1996 | Robinson et al. ........... 384/617 |
| 5,791,953 A | 8/1998 | Gunderson et al. |
| 5,819,790 A | 10/1998 | Cooper |
| 6,637,449 B2 * | 10/2003 | Nagai et al. .............. 137/15.18 |
| 6,796,327 B2 | 9/2004 | Bodnar |
| 6,871,664 B2 | 3/2005 | O'Shea |
| 7,128,091 B2 | 10/2006 | Istre, Jr. |
| 2005/0275185 A1* | 12/2005 | Peters et al. ........... 280/124.177 |
| 2006/0266422 A1 | 11/2006 | Feenstra et al. |

* cited by examiner

*Primary Examiner* — John Rivell
*Assistant Examiner* — William McCalister
(74) *Attorney, Agent, or Firm* — Ingrassia Fisher & Lorenz, P.C.

(57) ABSTRACT

Methods and apparatus are provided for retaining a hinge shaft of a check valve with a bushing. The check valve includes a valve body defining a flow passage therethrough; a hinge shaft; a bushing coupled to the valve body and welded to the hinge shaft; and a closure element pivotally mounted on the hinge shaft for opening and closing the flow passage.

6 Claims, 3 Drawing Sheets

CHECK VALVES WITH HINGE SHAFTS RETAINED BY WELDING

STATEMENT REGARDING FEDERALLY SPONSORED RESEARCH OR DEVELOPMENT

This invention was made with Government support under Contract Number N00019-02-C-3002 of the Joint Strike Fighter Program. The Government has certain rights in this invention

TECHNICAL FIELD

The present invention generally relates to check valves with flapper closure elements, and more particularly relates to methods and apparatus for retaining the hinge shaft on which the closure elements of check valves are pivotally mounted.

BACKGROUND

Check valves with flapper (or "wafer") type closure elements are utilized in many industries. The check valves are typically mounted in pipes or other such conduits enable fluid flow in one direction and prevent fluid flow in the opposite direction. The closure elements of the check valve are pivotally mounted on a hinge shaft and can be biased closed by a resilient element such as a hinge spring. The hinge shaft is typically mounted by press fitting the ends of the hinge shaft in through holes formed in a valve body. The valve body is then mounted in a pipe or conduit, for example, to enable air intake for an engine of an aircraft.

Conventional check valves can encounter problems because the hinge shaft may loosen and migrate out of the valve body. This issue is exacerbated by the high temperature and vibration environments of many types of check valves, particularly where there is a clearance between the valve body and the walls of the conduit in which it is mounted.

Accordingly, it is desirable to provide methods and apparatus for satisfactorily retaining hinge shafts in check valves. In addition, it is desirable to provide check valves that securely retain their hinge shafts in high temperature and vibration environments. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a check valve includes a valve body defining a flow passage therethrough; a hinge shaft; a bushing coupled to the valve body and welded to the hinge shaft; and a closure element pivotally mounted on the hinge shaft for opening and closing the flow passage.

In accordance with another exemplary embodiment, a method of retaining a hinge shaft in a check valve is provided. The method includes the steps of mounting a bushing on the hinge shaft; coupling the bushing to a valve body of the check valve; and welding the bushing to the hinge shaft to prevent movement of the hinge shaft in a longitudinal direction In accordance with yet another exemplary embodiment, a check valve includes a a valve body defining a flow passage therethrough; a hinge shaft; a bushing coupled to the valve body; a washer welded to the valve body and the hinge shaft; and a closure element pivotally mounted on the hinge shaft for opening and closing the flow passage

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
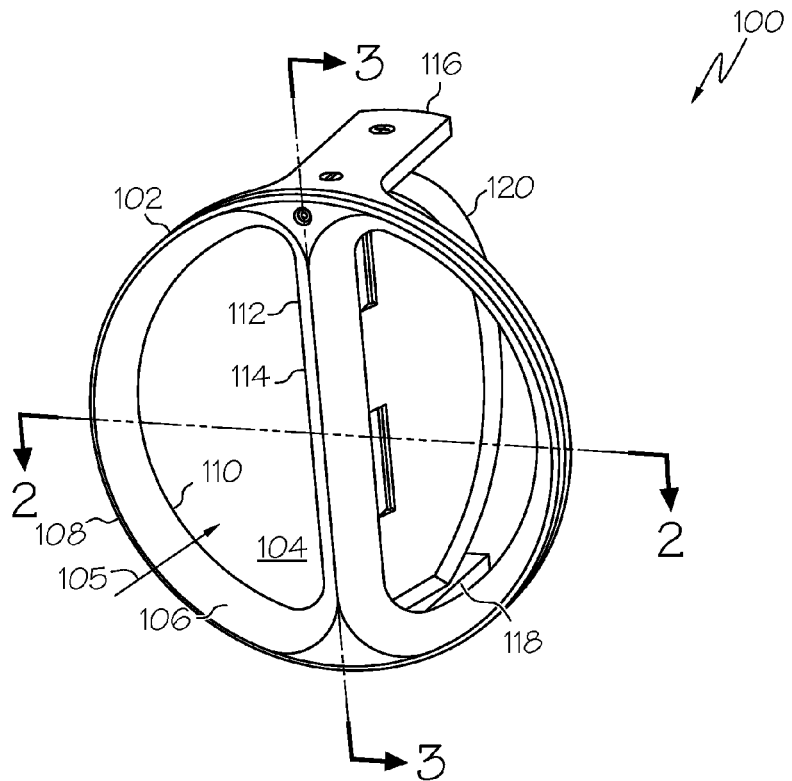
FIG. 1 is an isometric view of a check valve in accordance with an exemplary embodiment.

FIG. 1 is an isometric view of a check valve 100 in accordance with an exemplary embodiment. The check valve 100 includes a valve body 102 having an annular configuration defining a central flow passage 104. The valve body 102 can be coupled to or within a pipe or conduit (not shown) to enable fluid flow into the pipe or conduit through the flow passage 104 in direction 105. As will be discussed in further detail below, the check valve 100 is urged open by fluid flowing in the direction 105 while preventing fluid from flowing out of the check valve 100 in an opposite direction.

The valve body 102 has an annular flange 106 that defines the flow passage 104 and that includes an upstream surface 108 and a downstream surface 110. In one embodiment, the flow passage 104 is about 7 inches in diameter, although other sizes may be utilized depending on the specific application. The valve body 102 further includes a transverse post 112 that extends diametrically across the flow passage 104. Generally, the transverse post 112 has an upstream surface 114 that is coplanar with the upstream surface 108 of the annular flange 106. The valve body 102 also includes first and second flanges 116 and 118, respectively, that extend perpendicularly to the plane of the annular flange 106.

Figure 2:
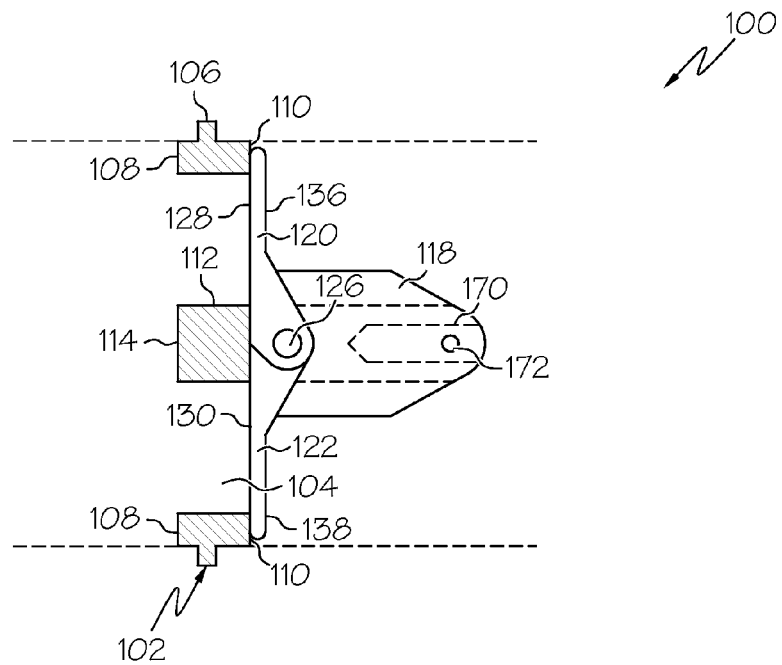
FIG. 2 is a cross-sectional view of the check valve of FIG. 1 through line 2-2.

As best shown in FIG. 2, which is a cross-sectional view of the check valve 100 of FIG. 1 through line 2-2, two generally flat valve closure elements 120 and 122 (also referred to as "flappers" or "wafers"), each shaped generally like one-half of a circular disc, are pivotally mounted on a hinge assembly 126. The closure elements 120 and 122 are preferably identical, having flat and smooth upstream surfaces 128 and 130 and downstream surfaces 136 and 138. In alternate embodiments, the closure elements 120 and 122 can be replaced by a greater or fewer number of closure elements, and/or the closure elements can have different shapes other than the semicircular shape in the depicted embodiment.

As described in further detail below, the closure elements 120 and 122 are resiliently biased into a closed position in which the upstream surfaces 128 and 130 of the closure elements 120 and 122 come to a fluid-tight rest against the downstream surface 110 of the annular flange 106, thus completely shutting off flow through the check valve 100. When the closure elements 120 and 122 are in their fully open position, as illustrated by the dashed image 170 of FIG. 2, the closure elements 120 and 122 rest against a stop 172 mounted in between the first and second flanges 116 and 118 generally parallel and downstream to the transverse post 112 and the hinge assembly 126.

Figure 3:
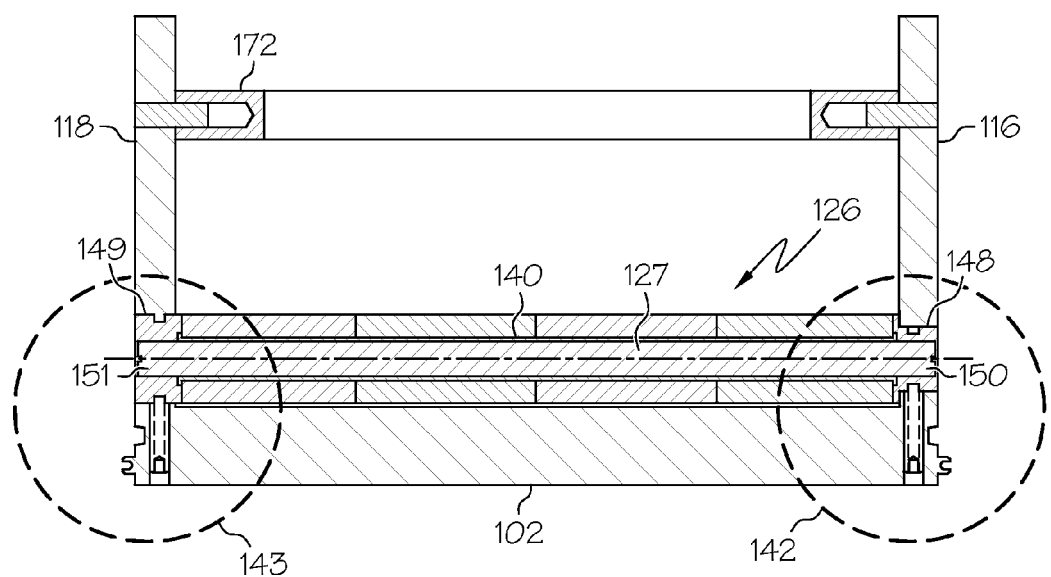
FIG. 3 is a cross-sectional view of the check valve of FIG. 1 through line 3-3.

As best shown in FIG. 3, which is a cross-sectional view of the check valve 100 of FIG. 1 through line 3-3, the hinge assembly 126 includes a hinge shaft 127 having end portions 150 and 151 mounted and secured in holes 148 and 149 formed in the first and second flanges 116 and 118. The hinge shaft 127 is generally cylindrical and has a circumferential surface 162, although other configurations and cross-sectional shapes, such as square or hexagonal, can be provided. Generally, both holes 148 and 149 are through holes, although one or more of the holes 148 and 149 can be blind holes. The hinge shaft 127 extends across the flow passage 104, generally parallel to the transverse post 112. The mechanism for retaining the hinge shaft 127 in holes 148 and 149 of the flanges 116 and 118 is discussed in further detail below.

The hinge assembly 126 includes helical spring 140 surrounding the hinge shaft 127. The helical spring 140 includes two ends 132 and 134 that bear against the downstream surfaces 136 and 138 (not shown in FIG. 3) of the closure elements 120 and 122 (not shown in FIG. 3), respectively, to bias them into their closed position (such as shown in FIG. 2). The force exerted by the helical spring 140 against the closure elements 120 and 122 is sufficient to hold them generally in the closed position, and to facilitate their automatic closure when fluid is not flowing through the valve, thereby preventing undesired reversed flow through the valve in the upstream direction. In an alternate embodiment, the helical spring 140 can be replaced by another resilient element, or omitted such that the valve is biased closed by gravity or air pressure.

Figure 4:
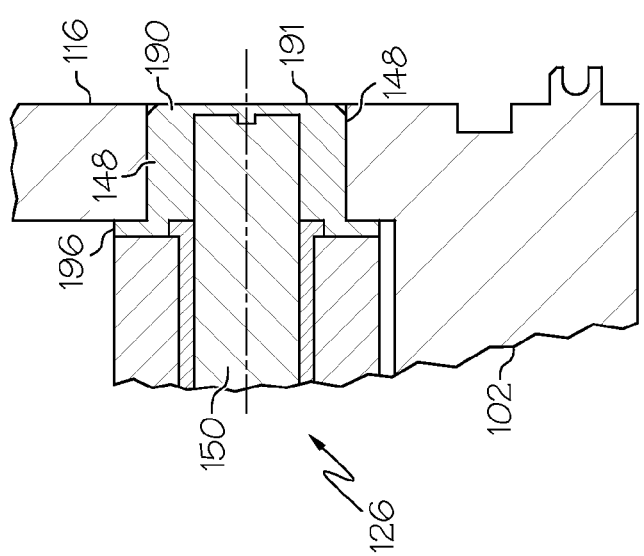
FIG. 4 is a more detailed view of a portion of FIG. 3.

FIG. 4 illustrates circled portion 142 (FIG. 3) of the check valve 100 in greater detail. Particularly, FIG. 4 illustrates how the hinge shaft 127 is mounted and secured in the first flange 116. The hinge assembly 126 further includes a bushing 190 that couples the hinge shaft 127 to the first flange 116 in hole 150. The bushing 190 serves as a cylindrical lining for hole 150 and can be manufactured from the same or different material as the hinge shaft. The bushing 190 is configured as a blind hole with a bottom wall 191 that prevents the hinge shaft 127 from migrating out of the bushing 190. The bushing 190 further includes a bushing flange 196 to support the bushing 190 in hole 150.

Figure 5:
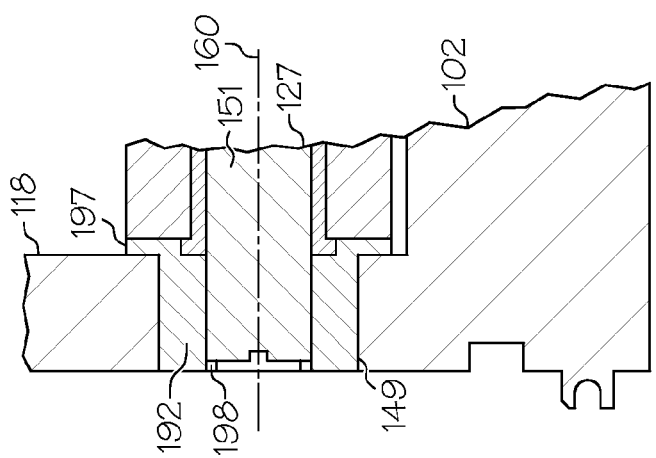
FIG. 5 is a more detailed view of another portion of FIG. 3.

FIG. 5 illustrates circled portion 143 (FIG. 3) of the check valve 100 in greater detail. Portion 143 is similar to portion 142 in that a bushing 192 couples the hinge shaft 127 to the second flange 118 in hole 149. In this embodiment, the bushing 192 is configured as a through hole. The bushing 192 is welded to the hinge shaft 127 at or adjacent to position 198 to retain the hinge shaft 127 in the bushing 192, and thus, in the valve body 102. The bushing 192 may also include a bushing flange 197 to support the bushing 192 in hole 149.

The material to weld the hinge shaft 127 to the bushing 192 may include the same or similar material to the material utilized to form the hinge shaft 127 and/or bushing 192, or a dissimilar material can also be used as filler material in the weld. The check valve 100 can be manufactured from any suitable metallic or non-metallic material, including plastics and ceramics. In one embodiment, the hinge shaft 127, the bushing 192, and the welding material include aluminum. Techniques for welding the hinge shaft 127 and the bushing 192 include fusion welding processes such as Gas Tungsten Arc Welding, Gas Metal Arc Welding, Laser Welding, and Electron-Beam Welding.

Figure 6:
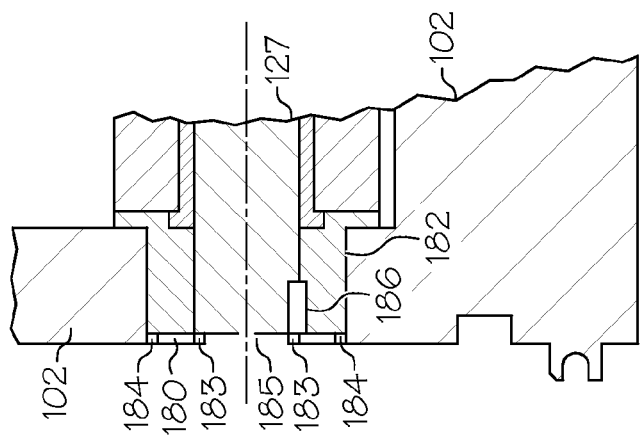
FIG. 6 is an alternate embodiment of the portion shown in FIG. 5.

FIG. 6 is an alternate embodiment of the portion 143 shown in FIG. 5. In FIG. 6, a bushing 182 can be, for example, manufactured from an unweldable material such as plastic ceramic. A retention component such as a washer 180 can be provided in a cavity 185 formed by the ends of the bushing 182 and the hinge shaft 127, as well as the valve body 102. The hinge shaft 127 can be welded to the washer 180, such as at position 183, and the valve body 102 can be welded to the washer 180, such as at position 184. Although FIG. 6 illustrates the cavity 185, other embodiments may omit the cavity 185. As also shown in FIG. 6, a pin 186 can be provided between the bushing 182 and the hinge shaft 127 to prevent rotation of the hinge shaft 127 relative to the bushing 182.

In an alternate embodiment, the bushings 190 and 192 can be omitted, and the hinge shaft 127 may be welded directly to the valve body 102. In yet another exemplary embodiment, a locking pin can be provided to engage one or more of the bushings 190 and 192 to assist the weld in retaining the hinge shaft 127. In another alternative, the bushing 190 can be configured as a through hole and welded to the hinge shaft 127.

Embodiments of the check valve 100 enable the hinge shaft 127 to be retained without a substantial change to the weight and/or space requirements, particularly in high temperature and/or vibration environments. In one embodiment, the check valve 100 can withstand temperatures from about −40° F. to about 330° F. Although embodiments have been discussed in connection with check valves, these embodiment can also be utilized to a hinge shaft 127 in other types of valves.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A check valve, comprising:
   a valve body defining a flow passage therethrough;
   a hinge shaft;
   a bushing coupled to the valve body
   a washer welded to the valve body and the hinge shaft; and
   a closure element pivotally mounted on the hinge shaft for opening and closing the flow passage.

2. The check valve of claim 1, wherein the washer secures the hinge shaft to the valve body to prevent movement thereof in a longitudinal direction.

3. The check valve of claim 1, further comprising a pin engaging the bushing and the hinge shaft to prevent relative rotation, wherein the pin is parallel to the hinge shaft.

4. The check valve of claim 1, wherein the washer is provided in a cavity formed by the bushing, valve body, and hinge shaft.

5. The check valve of claim 1, wherein the bushing comprises a cylindrical body configured as a through hole.

6. The check valve of claim 1, wherein the hinge shaft has first and second end portions, and wherein the bushing couples the first end portion of the hinge shaft to the valve body, wherein the washer is further welded to the bushing.

* * * * *